ured Kingdom Patent
United States Patent [19]

Pelgrom et al.

[11] Patent Number: 4,563,752
[45] Date of Patent: Jan. 7, 1986

[54] SERIES/PARALLEL/SERIES SHIFT REGISTER MEMORY COMPRISING REDUNDANT PARALLEL-CONNECTED STORAGE REGISTERS, AND DISPLAY APPARATUS COMPRISING A PICTURE MEMORY THUS ORGANIZED

[75] Inventors: Marcellinus J. M. Pelgrom; Arie Slob; Hendrik A. Harwig; Jan W. Slotboom, all of Eindhoven, Netherlands

[73] Assignee: U.S. Philips Corporation, New York, N.Y.

[21] Appl. No.: 501,464

[22] Filed: Jun. 6, 1983

[30] Foreign Application Priority Data

Jun. 11, 1982 [NL] Netherlands .................. 8202365

[51] Int. Cl.⁴ .................. G11C 19/08; G06F 11/20
[52] U.S. Cl. .................. 364/900; 365/1
[58] Field of Search .................. 365/78, 200, 1, 15, 365/238, 83, 219; 364/200 MS File, 900 MS File; 371/10, 15

[56] References Cited
U.S. PATENT DOCUMENTS

| 3,950,732 | 4/1976 | Chang | 365/1 |
| 4,056,812 | 11/1977 | Bobeck | 365/15 |
| 4,073,012 | 2/1978 | Ohnigian | 365/15 |
| 4,092,734 | 5/1978 | Collins | 365/238 |
| 4,139,886 | 2/1979 | White | 365/1 |
| 4,155,121 | 5/1979 | Jambotkar | 365/200 |
| 4,349,893 | 9/1982 | Wiegman | 365/20 |

Primary Examiner—James D. Thomas
Assistant Examiner—Florin Munteanu
Attorney, Agent, or Firm—Jack E. Haken; James J. Cannon, Jr.

[57] ABSTRACT

A series/parallel/series shift register memory comprises a substrate on which there are provided storage positions for multivalent data elements. There is provided a redundancy generator for generating one or more redundant code elements on the basis of a group of data elements, said redundant code elements being applied to the series input of the shift register memory later than the associated data elements. The code elements are conducted through parallel-connected storage registers which are shorter than those used for the associated data elements, so that a redundancy reducer receives the redundant code elements from a series output before the associated data elements appear on this series output. The reduction of the storage registers, expressed in periods of the shift drive, can be performed in different ways from a technological point of view.

9 Claims, 7 Drawing Figures

SERIES/PARALLEL/SERIES SHIFT REGISTER MEMORY COMPRISING REDUNDANT PARALLEL-CONNECTED STORAGE REGISTERS, AND DISPLAY APPARATUS COMPRISING A PICTURE MEMORY THUS ORGANIZED

BACKGROUND OF THE INVENTION

1. Field of the Invention

The invention relates to a series/parallel/series shift register memory comprising a substrate on which there are provided storage positions for the storage of data elements each of which is represented by a multivalent, single physical quantity in that storage position, said shift register memory also comprising a serial data input for electric signals, a converter for converting an electric signal received into a data element representation, a serial input register which is connected to the converter and which comprises $n>1$ first switch positions, a number of storage registers, each of which is connected to a respective first switch position, and a serial output register which is connected to the storage registers via respective second switch positions and which comprises a serial data output, said shift register memory also comprising a transfer control device which, after the formation of n data representations in the input register, transfers these data representations in parallel to the storage registers in a recurrent manner and which also presents an equal number of data representations from the storage registers to the output register, said transfer control device otherwise activating only the input/output registers, said shift register memory also comprising a redundancy generator for forming, on the basis of the reception of $p<n$ data elements, at least one additional, redundant code element to be included in a series of said n data representations.

2. Description of the Prior Art

Two categories of such shift register memories are known. According to U.S. Pat. No. 4,155,121 the physical quantity is an electric charge in an integrated capacitor. This charge is advanced in steps by electric driving; these are so-called charge-coupled devices which form a sub-category of charge transfer devices. Such devices can be used for bivalent data, for data having a finite number of values larger than two, or for analog data. According to U.S. Pat. No. 4,073,012 the physical quantity is a local magnetization in a ferromagnetic material, that is to say a magnetic bubble. The magnetic bubbles can be driven by a magnetic field which rotates in the plane of the substrate, by the energizing of current conductors provided on the substrate, or in a different manner. Faults occur during the manufacture of such memories usually in the comparatively large surface area covered by the storage registers. The yield of the manufacturing process can be increased by way of redundant storage registers, for example registers which are used instead of one or more faulty storage registers. The detection of faulty storage registers may be performed, for example, as a final test during manufacture. During the later use of the shift register memory a given data correction can then be performed by way of one or more redundant code bits which are added to a group of data bits and which can be substituted, for an associated data bit. The detection of faulty storage registers may also be performed during operation, for example as described a copending U.S. patent application which is being filed simultaneously herewith and based on Netherlands patent application 8202364 assigned to the assignee of this application, which has been filed on the same day as the present application and which is incorporated herein by way of reference.

SUMMARY OF THE INVENTION

It is an object of the present invention to make the redundant code elements which can be generated only after the reception of the associated data bits available on the output of the shift register memory before the relevant data bits are presented on this output, inter alia to render the storage length calculated in periods of the drive of the shift register memory independent of the degree of added redundancy.

The object is achieved in that in accordance with the invention said redundancy generator has a built-in delay in order to apply at least one redundant code element to said data input later than the associated group of data elements, the storage registers having a length of $m>2$ storage positions for said group of data elements in order to form a storage length of at least 3n storage periods between the serial data input and the serial data output which is uniform within said group of data elements, and for at least one associated redundant code element a length of $1<t\leq(m-1)$ storage periods in order to form therefor a storage length which comprises at least 2n storage periods but which is at least n storage periods smaller than said uniform storage length, there also being provided a redundancy reducer with a built-in delay in order to process said at least one redundant code element together with the associated group of data elements appearing later on said data output. The redundant organization is thus invisible for a user of the shift register memory.

Preferably, each group of n bits successively presented to the data input comprises at least two redundant code elements, the shift register memory having a second uniform storage length for these redundant code elements. This results in a simple organization because the number of different storage lengths is, for example, not larger than two.

Preferably, said redundancy generator and redundancy reducer comprise a storage element for the storage of a data element which is copied to form a code element or for the resubstitution of said code element in the position of the originating data element within the relevant group of data elements. Thus, a redundant storage register can be easily substituted as it were for a faulty storage register, so that the latter will be ignored. The drive is thus simplified.

Preferably, the storage registers comprise a modular configuration of storage positions, a storage register intended for a redundant code element comprising a module position which entirely forms part of a neighboring storage position of the same storage register due to enlargement of the latter storage position. This results in a simple implementation as will be illustrated hereinafter. It is sometimes advantageous to divide the area of a "missing" storage position between a number of other storage positions.

Preferably, the storage positions, the converter the redundancy generator and the redundancy reducer are suitable for the processing of bivalent data elements or code elements. Such a shift register memory is simple and can be used very well in systems in which only binary signals are processed after or not after analog-to-digital conversion.

The invention also relates to a substrate, comprising a serial input register, a serial output register, and a number K of storage registers K>1 of different length which are connected in parallel between the input register and the output register and which are intended to be incorporated in a series/parallel/series shift register memory of the described kind. Evidently, the increasing and reducing of the redundancy can be performed by components which are accommodated on the same substrate as well as by external circuits. This choice will usually be determined by the technology used.

The invention also relates to a memory system comprising at least two series/parallel/series shift register memories having mutually identical storage configurations, at least one of said memories being a series/parallel/series shift register memory of the described kind, there being provided a synchronization device for driving said at least two series/parallel/series shift register memories at least isochronously at the bit level. Usually a corresponding storage configuration will be chosen which means that the series and parallel sections of the memories have the same length, so that the inherent delay of the data information is also the same. The organization of the redundancy may then be mutually different. Furthermore, two recurrent phenomena are isochronous when they exhibit a fixed time position with respect to the successive cycles of one another. Synchronism is therefore a sub-category of isochronism.

The invention also relates to a display apparatus comprising a series/parallel/series shift register memory or memory system of the described kind in which the storage capacity of the memory or the memory system suffices for the storage of a two-dimensional picture frame organized in picture lines. This is a very attractive application for such shift register memories.

BRIEF DESCRIPTION OF THE FIGURES

The invention by way of example will be described in detail hereinafter with reference to some figures.

DESCRIPTION OF THE PREFERRED EMBODIMENTS

Figure 1:
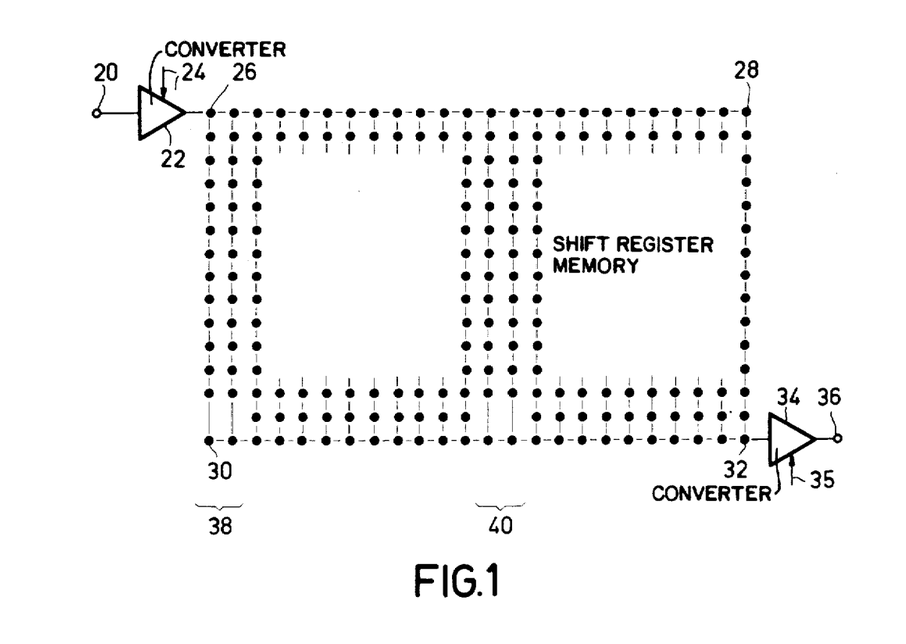
FIG. 1 is a diagram of a series/parallel/series shift register memory.

FIG. 1 is a diagram of a series/parallel/series shift register memory. Mainly the serial input/output registers and the storage registers are shown. The storage positions are denoted by black dots; the physical construction will be described later. Element 20 is a serial data input for electric signals. These signals may be bivalent signals, quantized multivalent signals or analog signals; however, hereinafter mainly bivalent signals will be considered for the sake of simplicity. Element 22 is a converter for converting the electric signals into a representation thereof. Thus, a signal pulse is converted into an amount of charge or, for example, a magnetic bubble. This converter can receive a separate synchronization or control signal on line 24. The storage positions between the indications 26 and 28, moreover, form switch positions because they can receive a representation from one side and can conduct this representation selectively to one of two further sides. In this example there are 24 switch positions of this kind. The series input register is thus formed. The storage positions between the indications 30 and 32 represent switch positions because they can receive a data representation from two sides and can output this representation to one further side. In this example there are 24 of such switch positions forming the series output register. Between the indications 28 and 32 there are situated thirteen storage positions, ignoring the switch positions which also form part of the input or output register. A storage register is thus formed. There are 24 of such storage registers; however, four thereof (at the indications 38 and 40) comprise one storage position less; this is symbolized by the omission of a black dot and the interconnection of the preceding and the next storage position of that storage register by a line. These shorter storage registers are intended for redundant code elements; the processing of these code elements will be described in detail with reference to FIG. 5a. To the series output register there is connected a converter 34 whose output 36 supplies an electric signal in order to make the temporarily storage data available for further use. A control signal may also be received on input 35. The memory thus has two kinds of storage registers in which the number of storage positions differs by one. In addition to the normal storage registers and the redundant storage registers comprising one storage position less further storage registers comprising different numbers of storage positions again may also be present. The operation of the memory is as follows. The data to be written is presented in ten successive periods of the drive of the series input register; subsequently, two redundant code bits are presented; these code bits form an error correction data group in conjunction with the former ten data bits, for example by way of an error correction code or because they comprise substitute bits as copies of those which would pass through a faulty storage register. If the data elements may have more than two values, generally a data element will be copied to form a code element. The error correction codes for bivalent data elements are amply described in the relevant literature. For example, in a number of $(2^q-1)$ data bits one arbitrary bit error can always be corrected when q redundant code bits are included. When only two redundant code bits are added, a triple majority code for only one data bit (for example, a most significant data bit) is obtained. The presentation of twelve data bits is repeated once after the described operation. When the 24 data bits thus formed have been aligned with the interval between the indications 26 and 28, they are transferred in parallel to the storage registers by appropriate actuation of the input switches. At the same time an equal amount of information is applied to the series output register and, moreover, all bits in the storage registers are driven one position downwards. The cycle is subsequently repeated. For the non-redundant bits the storage length of the shift register memory equals 14×24 periods of the drive, the length of the serial registers corresponding to 24 of such periods. For the redundant bits the storage length of the shift register memory equals 13×24 periods of the drive. Consequently, the redundant code bits appear on the output 36 before the associated data bits (for which they implement the redundancy) appear on the same output, because the storage length of the shift register memory is smaller for these redundant code bits.

Figure 2:
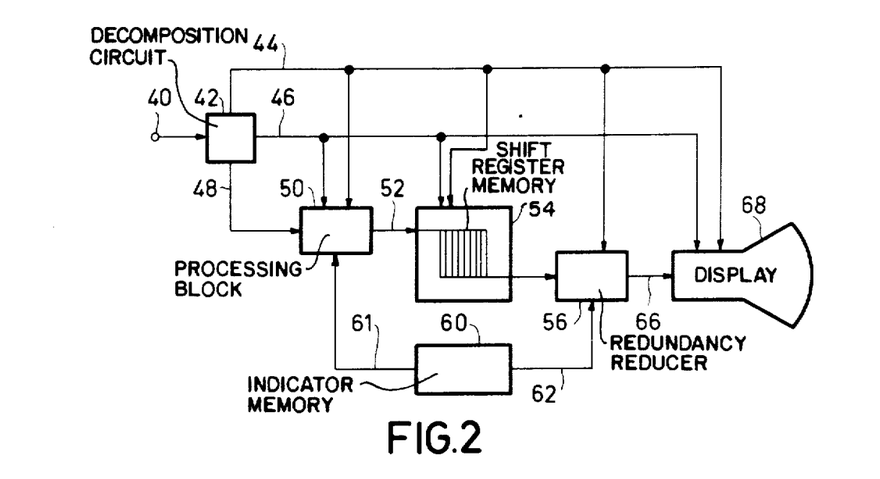
FIG. 2 is a block diagram of a display apparatus comprising such a shift register.

FIG. 2 is a block diagram of a display apparatus comprising such a shift register memory. This picture is organized as a normal television picture with, for example, 920 pixels per picture line. The composite video signal arrives on input 40. In the decomposition circuit 42 the pixel frequency signal, for example 17.7 MHz, is derived therefrom and also line flyback signals and frame flyback signals. Furthermore, for each pixel the analog information may be converted into a bit series of, for example, 8 bits which appears on output 48. The figure shows only the processing of one of these 8 bits. Seven corresponding circuits which operate in synchronism with the circuit shown are provided for the other seven bits. Alternatively, these eight bits are distributed between a number of series/parallel/series shift registers which is smaller than eight; this is achieved by the demultiplexing of the eight data bits, for example according to 2:1. The reverse is also possible, for example by the multiplexing of the data bits of successive pixels cyclically between two or more groups of eight series/parallel/series shift registers. Processing block 50 comprises the redundancy generator for adding each time a fixed number of additional, redundant code bits to a number of p data bits. This may notably concern a copy of one or more of the data bits, so that in a group of n data bits one or more data bits are included two or more times. The processing block 50 receives the pixel frequency signals on line 44 and the line flyback signals on line 46 as the synchronization signals. For each picture line the same pixels in the series may be used, while at the most a predetermined number of data bits (which would otherwise have to pass through a faulty storage register) are copied into redundant bit positions. Copying is controlled by an indicator memory 60 which indicates the bits to be copied. It is alternatively possible to use at least some of the redundant code bits for the detection of faulty storage registers, for example by way of a majority code. For each picture line a relevant number of data bits is then copied and applied to the shorter storage registers so that they are available on the output of the storage register memory before the associated data bits appear. Per picture line the processing block 50 thus successively outputs: the 920 pixel bits, the redundant code bits and as many dummy bits as must be applied to the redundant storage registers not to be used. The redundant bits which become available no later than the instant when all associated data bits have been treated are thus presented to the shift register after these data bits in such manner that they pass through the shorter storage registers. To output 52 there is connected a series-parallel-series shift register memory which is organized, for example in the same way as shown in FIG. 1. Preferably, there are 920 storage registers for data bits and one block of 60 shorter storage registers for redundancy bits. This block may be situated in different positions in an arrangement as shown in FIG. 1. The series/parallel/series memory 54 receives the pixel frequency signals in order to activate the input/output registers and for the converters 22 and 34 of FIG. 1. The shift register memory 54 also receives the line flyback signals for activation of the storage registers. This simplified set-up does not shown the circuit which is required to ensure that, per picture line, exactly the correct number of activation pulses is applied to the input/output registers. This number equals, for example, 980. Block 56 represents a redundancy reducer for substituting redundant code bits for the data bits originating from faulty storage registers. To this end, the block 56 receives the information as to which storage registers are unreliable on line 62 from the indicator memory 60. The information on the lines 61 and 62 will usually be identical. In given cases the block 56 may comprise a circuit for classifying a storage register as being "in order" or "faulty" by comparison of redundant code bits and associated data bits. The relevant information must then be applied to the indicator memory 60 in order to ensure that from then on a redundant code bit and the associated storage register are always assigned to a faulty storage register. After substitution, the picture information is reformatted and presented to output 66 without added redundant code bits. To this output there is connected a digital to analog converter cum the actual display device 68 which may be of a conventional type. This device also receives the pixel frequency signals and the line flyback and frame flyback signals.

The picture memory may also be used for performing given operations on the picture; it may also be used to store the picture for some time by way of a feedback connection. Moreover, picture memories may be present for several pictures in parallel, with selection inputs connected to the input and the output. Several picture memories in a multiplex organization may also be connected to output 48.

Figure 3:
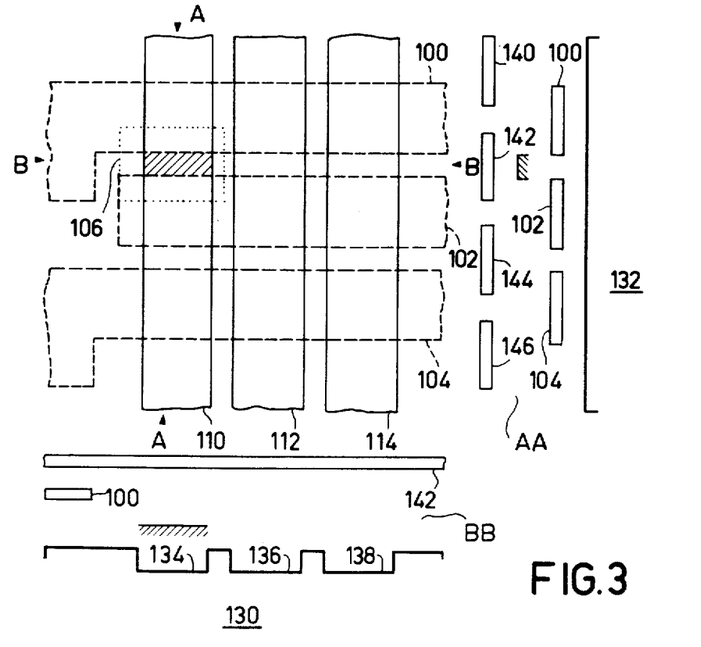
FIG. 3 shows a detail of a first embodiment of such a shift register memory.

FIG. 3 shows a detail of a first embodiment of such a shaft register memory for a charge transfer device. Only a small part of the storage registers is shown with a few modularly arranged storage positions and one enlarged storage position. The general technology of such a series/parallel/series shift register is described in the copending U.S. patent application Ser. No. 414,109, filed Sept. 2, 1982, assigned to the assignee of the present application, which is incorporated herein by way of reference. The figure diagrammatically shows a plan view and two sectional views taken along the arrows AA and BB. In the plan view the charge transfer channels extend from the top downwards. The shift register is constructed, for example, as a p-type semiconductor substrate (130, 132). The charge transfer channels are defined in that a comparatively thick oxide layer ($SiO_2$) exhibits strip-shaped recesses (134, 136, 138) at the area of these channels. The channels have a width of, for example, 5 microns and the separating edges have a width of, for example, 2 microns; the layer thickness is, for example, from ½ to 1 micron. In order to prevent the formation of parasitic channels, the p-doping is locally increased underneath the oxide pattern. At the location of the channels the substrate layer is covered with an insulating silicon oxide layer having a thickness of from 0.05 to 0.07 microns. On this layer in the present embodiment there is provided a two-layer wiring system which comprises strips extending from left to right in the figure. The number of wiring layers may also be larger than two. First of all there is provided a series of electrodes of, for example, polycrystalline silicon (100, 102, 104) which are shown in a plan view as well as in a sectional view. A second series of electrodes (140–146) which are made of, for example, aluminium are arranged in an alternating manner with respect to the former electrodes. The two sets of conductors partly overlap and are insulated from one another by an additional oxide layer (not shown). For the sake of simplicity this second set of conductors has been omitted in the plan view. The electrodes can be activated in two-phase operation. To this end every two electrodes of the different layers are interconnected, for example the pairs 100/140, 102/142, 104/144; this interconnection determines the transport direction. The interconnection 100/142, 102/144 would then produce the opposite transport direction. Furthermore, during two-phase operation the electrodes 100 and 104 are connected to one another and also to the alternating electrodes (not shown) of the layer of polysilicon electrodes. Consequently, they are electrically separate from the electrode 102 which itself is connected to the set of alternate electrodes of the layer of polysilicon electrodes. For each relevant channel the part underneath a polysilicon line thus forms a charge storage area. During two-phase operation the successive storage areas in a given channel are then successively "occupied" and "vacant". By application of a suitable potential to the aluminium electrode situated between the two storage areas, a charge path is established between two adjacent storage areas. After restoration of the original potentials, the charge has thus been advanced through one storage position because each polysilicon electrode is coupled to the associated aluminium electrode; a preferred direction is thus created. After two drive operations (even and odd sets of conductors), the charges have been advanced through two storage positions and the next drive cycle may commence.

Driving can similarly be performed in more phases, for example in three phases. In that case each polysilicon electrode is connected to the electrode which is situated two positions further on. One of every three successive storage positions is then empty and the other two positions are filled. By such driving of a set of polysilicon electrodes, the vacant locations are displaced as it were over one storage position (as before, a two-layer wiring system is concerned).

The channels are denoted by the reference numerals 110, 112 and 114, the reference numerals 112, 114 indicating a channel of standard length while the reference numeral 110 indicates a shorter channel; at this area the insulation between two successive polysilicon electrodes is eliminated by an additional diffusion. Diffusion is performed by means of a mask whose circumference (window) is denoted by a dotted line. The area actually influenced by diffusion is shaded; it is apparent that the edges of the polysilicon electrodes 100, 102, co-define the diffusion window at the upper and the lower side. The definition at the left and the right is provided by a special mask; the edge of this effect is denoted by a dotted line. This definition is co-determined by the fact that diffusion has no or only little effect in the thickened edges of the field oxide. Thus, two charge storage positions are coupled as it were. This diffusion is only indicated as regards its location in the sectional view. The diffusion process step is performed after the provision of the polysilicon electrodes, but before the aluminium electrodes are provided. Therefore, when the insulation between the storage positions at the area of the electrodes 102 and 104 is present, three successive storage positions are coupled by adequate driving so that a data representation can be displayed over two storage positions (when the preferred displacement direction extends from the top downwards in the figure). In the case of the other preferred displacement direction, the displacement over two storage positions is performed when the carrier underneath the aluminium electrode 140 is temporarily conductive. The channel 10 thus comprises one storage position less, because this module position forms part of the neighboring storage position. Expressed in periods of the drive the length of the channel 110 is also one unit smaller. The length of a storage register can be reduced by more than one storage position in a similar manner. It is to be noted that in the sectional views AA and BB the vertical positioning is shown in an exploded view with respect to the substrate body.

Figure 4:
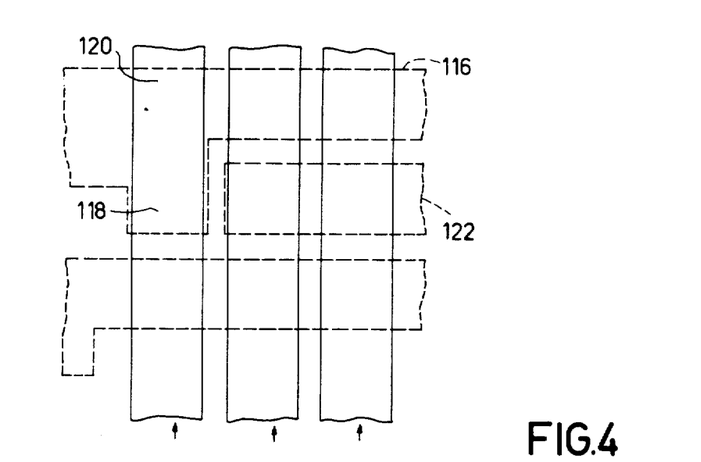
FIG. 4 shows a detail of a second embodiment of such a shift register memory.

FIG. 4 shows a detail of a second embodiment of such a shift register memory. The general geometrical setup corresponds to that of FIG. 3. Using a specific mask shape, the polysilicon conductor 116 is now formed to be different by way of a protrusion at 118; the polysilicon electrode 122 has given up a part as it were. In this configuration the storage positions at 118 and 120 are again interconnected, so that the relevant storage register is one unit smaller expressed in periods of the drive. The embodiments shown in the FIGS. 3 and 4 have their own specific advantages.

Figure 5A:
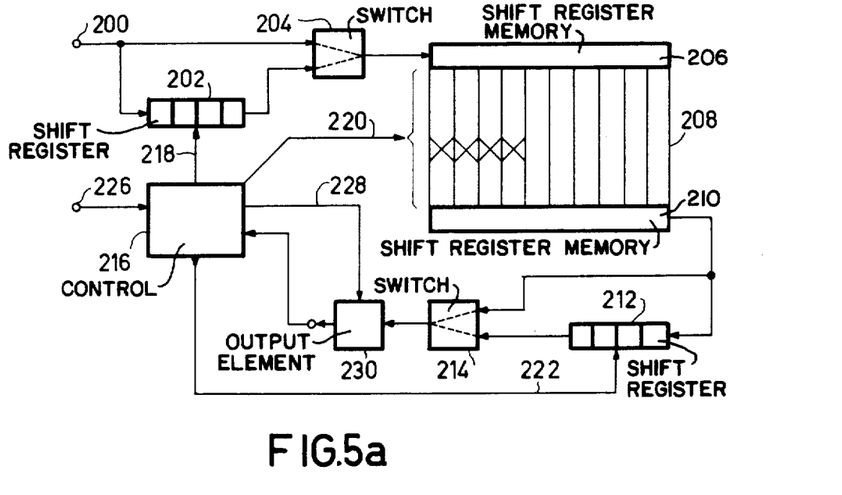
FIG. 5a shows a control device for such a shift register memory.
Figure 5B:
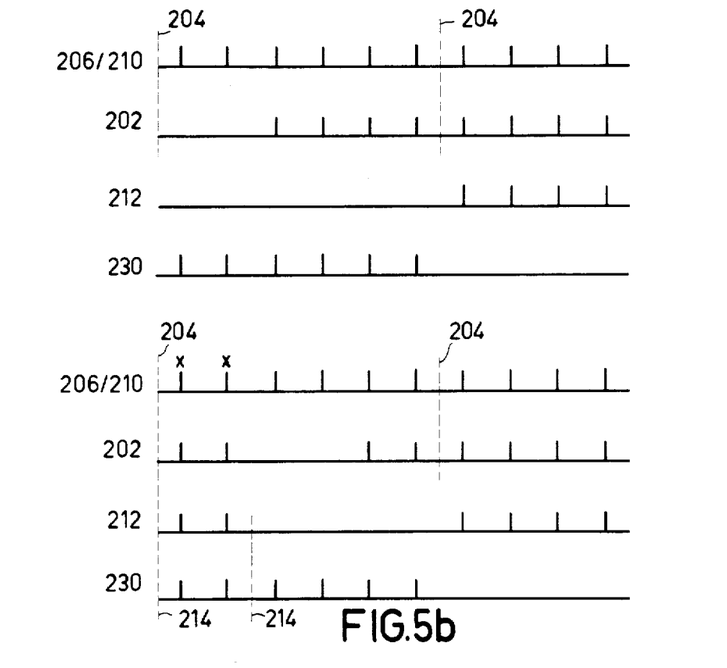
FIG. 5b shows an associated timing diagram of the control signals.

FIG. 5a shows a control device for such a shift register memory. First the operation during which no correction is required will be considered. FIG. 5b shows a time diagram of control signals for FIG. 5a. The data bits arrive on input 200; in this simple embodiment they arrive in groups of six, each time together with six synchronisation pulses on line 226. Control device 216 then applies six series pulses to shift register memory 206/208/210, so that the six data bits are taken up in the series input register, first line. On a line from the indicator memory (not shown) the information is received that all parallel storage registers are in order, so that substitution is not necessary. Consequently, the shift register 202 may be filled with arbitrary data bits; for this purpose the last four data bits are selected: the first four drive pulses on line 218 (second line in FIG. 5b) thus coincide with the third to the sixth pulse on the first line of FIG. 5b. Subsequently, the switch 204 is switched over by a signal (not shown), so that the output of the shift register 202 is connected to the input of the shift register 206. The shift registers 202, 206 and 210 subsequently receive four shift pulses and the series input register is filled (four bits are thus present twice). At the end of these ten pulses, the switch 204 is again set to the position in which the input 200 is directly coupled to the series input register 206. Subsequently, the register memory 208 receives a parallel pulse so that the entire content is shifted one position downwards. When the four (arbitrary) redundant bits appear in the series output register, they are shifted into the register 212 by way of clock pulses on line 222 (FIG. 5b, third line, last four clock pulses). The associated data bits appear only during the next cycle. When they appear, they proceed directly, via the switch 214, to the clocked output element 230 (FIG. 5b, fourth line) and to the user output. The redundancy is thus removed again.

The next four lines of FIG. 5b correspond to the first four lines but for the case where the two extreme right storage registers of the shift register memory 208 are faulty; therefore, the first two data bits on the fifth line must be applied to the register 202. At the end of the six data bits, only the fifth and the sixth bit are applied (as dummies) to the shift register 202. The register 212 is filled (seventh line, four extreme right drive pulses) in the same manner. However, at the beginning of a new series of bits first the switch 214 is now switched over, so that the output of the shift register 212 is connected to the output element. This switch-over is indicated by a vertical broken line "214" as previously for the switch 204. After application of the two substitution bits to output element 230, the switch 214 is switched over again (vertical broken line) and the drive is as shown in the upper half of FIG. 5b. In given circumstances it may occur that the switch 214 must be set as well as reset for each substitution bit. The control of the switch 214 is not shown.

The integrity of the storage registers can be determined by means of test information. When a serial input/output register is faulty, the shift register memory is unusable. When a storage register is faulty, its number (extending from right to left in the figure) is stored. The test information may consist of, for example, a number of information series such as 000000, 010101, 101010, 111111 in a given succession. The control device comprises a counter which counts the pulses on the line 226. When the counter position corresponds to the number of a faulty storage register, the shift register 202 also receives a pulse, so that the data bit intended for this storage register is also stored in the register 202. For the sake of simplicity it is assumed in FIG. 5b that the input and the output are controlled in synchronism. Evidently, a phase difference may occur at the bit level as well as at the row level. In the latter case, for example, the taking up of a group of data bits and the outputting of a group of data bits by the parallel storage registers take place with an alternating synchronization.

Figure 6:
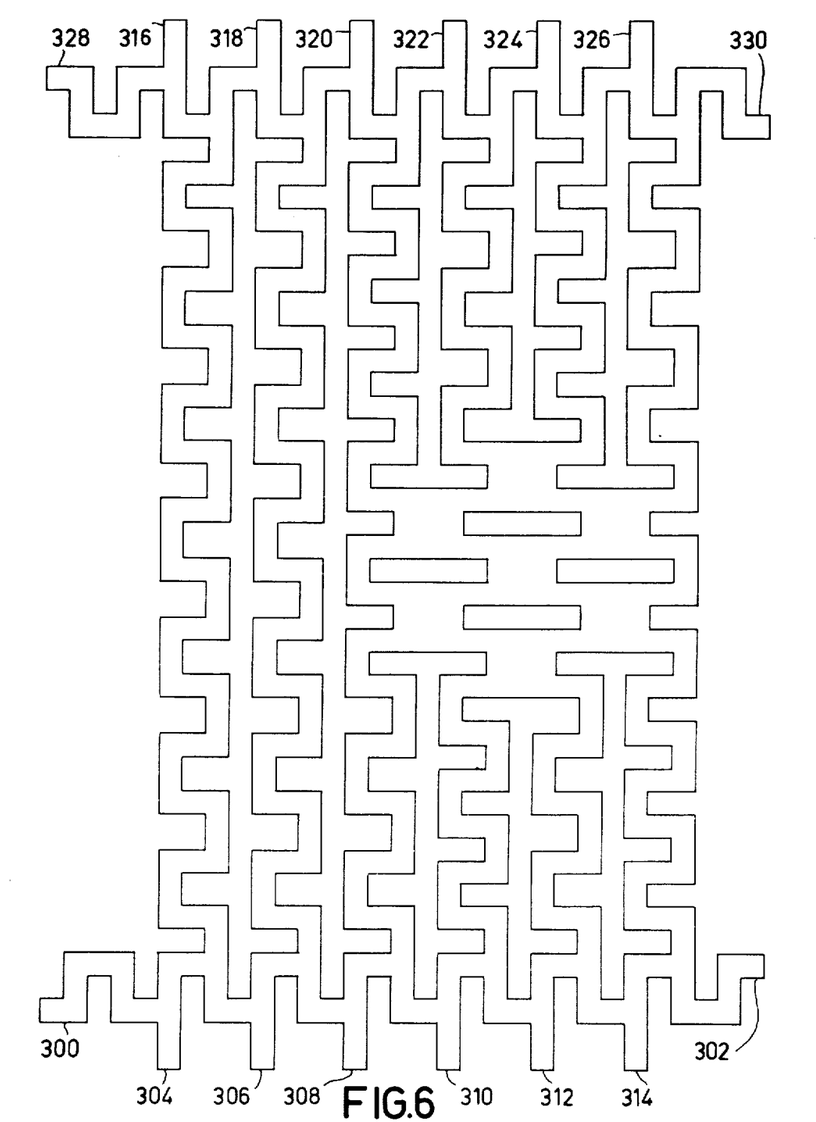
FIG. 6 shows a third embodiment of a shift register memory.

FIG. 6 shows a third embodiment of a modified shift register memory for use in conjunction with magnetic bubbles. This embodiment is an elaboration of a shift register memory as described in U.S. Pat. No. 4,349,893 assigned to the assignee of this application. The magnetic bubbles are sustained in a substrate of ferromagnetic material by means of a bias magnetic field which extends transversely of the substrate. Driving is performed by the energizing of current conductors on the substrate which are shaped so as to be more or less crenellated or sinusoidal. Energizing takes place by means of alternately directed, more or less squarewave currents. The shift registers operate unidirectionally in that they comprise appropriate elements of, for example, permalloy which are also provided on the substrate and which have been omitted in the figure for the sake of simplicity.

The input register now extends from indication 300 to indication 302. The generators for the drive currents and the generators for the magnetic bubbles have been omitted. A magnetic bubble can be driven in each successive period of the conductor (meander conductor) of the input register. Between the indications 304–314 and 316–326 the storage registers are situated. The construction of these storage registers is in principle the same as that of the series input register. The generator for the drive currents is not shown therein. The storage registers may be connected to the generator in parallel but in that case means must be provided to prevent shortcircuiting of the input register. Resistors may be connected in series with the storage registers. Between the indications 328 and 330 there is situated the series output register for which the current generator and the bubble detector to be provided in the direction of the indication 330 have been omitted. When a magnetic bubble has been driven through the input register as far as the input position of a storage register, it can be taken up in this storage register by the energizing of a meander conductor associated with this storage register. When this bubble has arrived in the output position of this storage register after a number of periods of the current in the meander conductor associated with this storage register, it can be outputted by the energizing of the meander conductor associated with the output register.

The figure shows a series input register between the indications 300 and 302, a series output register between the indications 328 and 330, and six storage registers between the indications 304–314 and 316–326. The two storage registers at the left have a length of 8½ periods (including the switch positions) and the four storage registers at the right have a length of 9½ periods. The two storage registers at the left may be reserved for redundant bits which thus appear before the associated data bits appear on the output.

What is claimed is:

1. A series-parallel-series shift register memory comprising:

a serial data input (200) for first electrical signals having a value range of at least two values;

a redundancy generator (202, 204) fed by said serial data input for generating, on the basis of a plurality of p successive first electrical signals, (n-p) greater than or equal to one redundant electrical signal;

a converter (22) fed by said redundancy generator for receiving said p first electrical signals and thereafter said (n-p) redundant electrical signals and converting each of these electrical signals into a series of p data representations; and a substrate comprising storage positions for the storage of a data representation as represented by a single physical quantity in that storage position;

said substrate having a serial input register (206) fed by said converter;

a plurality of parallel storage registers (208) fed in parallel by parallel outputs of said serial input register; and a serial output register (210) fed in parallel by the output of each of said storage registers; and comprising:

a serial data output (32), wherein said storage registers comprise first storage registers for transiently storing data representations of said first electrical signals in series of equal lengths of m>2 storage positions each; and second storage registers for transiently storing data representations of said redundant electrical signals in a second series of equal lengths of $1<t\leq(m-1)$ storage positions each;

said shift register memory having a transfer control device for transferring these representations in parallel to the storage registers after introduction of n data representations in the input register and at the same time transferring n data representations from the storage registers to the output register;

said transfer control otherwise activating only the input/and output registers, whereby the storage length of said first storage registers is longer than the storage length of said second storage registers;

said shift register memory furthermore comprising a second converter (34) fed by said serial data output for reconstituting electrical signals from data representations received; and a redundancy reducer (212, 214) fed by said second converter for receiving first said (n-p) redundant signals and thereafter said p first electrical signals and thereby correcting at least one deficient electrical signal within said p first electrical signals for outputting said p first electrical signals on a serial data output (230) element.

2. A series/parallel/series shift register memory as claimed in claim 1, characterized in that each group of n bits successively presented to the data input comprises at least two redundant code elements, the series/parallel/series shift register memory having a second equal storage length for these redundant code elements.

3. A series/parallel/series shift register memory as claimed in claim 1 or 2, characterized in that said redundancy generator and redundancy reducer each comprise a storage element for the storage of a data element which is copied to form a redundant code element and for the resubstitution of said code element in the position of the originating data element within the same group of data elements.

4. A series/parallel/series shift register memory as claimed in claim 1 or 2 in which the storage registers comprise a modular array configuration of storage positions, characterized in that a storage register intended for a redundant code element comprises an array position (118) which entirely forms part of a neighboring array storage position of the same storage register due to enlargement of the latter storage position.

5. A series/parallel/series shift register memory as claimed in any of the claims 1 or 2, characterized in that the storage positions, the converters, the redundancy generator and the redundancy reducer are suitable for the processing of bivalent data elements or code elements.

6. A series/parallel/series shift register memory as claimed in claim 5, characterized in that the storage positions are formed to accommodate magnetic bubbles.

7. A series/parallel/series shift register memory as claimed in any of the claims 1 or 2, characterized in that the storage positions form a charge transfer device.

8. In a series/parallel/series shift register memory of claims 1 or 2 wherein the substrate comprises a serial input register, a serial output register, and a number K of storage registers (K>1) of different lengths as measured in a number of storage periods which are connected in parallel between the input register and the output register.

9. A display apparatus comprising a series/parallel/series shift register memory as claimed in any one of claims 1 or 2, characterized in that the storage capacity of the series/parallel/series shift register memory suffices for the storage of a two-dimensional picture frame organized in picture lines.

* * * * *